United States Patent [19]

Becherer et al.

[11] Patent Number: 4,494,706
[45] Date of Patent: Jan. 22, 1985

[54] APPARATUS FOR CONVOLUTING STRIPS OF PHOTOSENSITIVE MATERIAL OR THE LIKE

[75] Inventors: Walter Becherer, Munich; Erwin Geyken, Neubiberg; Nikolaus Jelinek, Munich, all of Fed. Rep. of Germany

[73] Assignee: AGFA-Gevaert Aktiengesellschaft, Leverkusen, Fed. Rep. of Germany

[21] Appl. No.: 498,131

[22] Filed: May 25, 1983

[30] Foreign Application Priority Data

Jun. 4, 1982 [DE]  Fed. Rep. of Germany ....... 3221221

[51] Int. Cl.³ .................... B65H 17/20; B65H 17/44
[52] U.S. Cl. ................................. 242/65; 242/67.1 R
[58] Field of Search ............... 242/67.5, 86, 187, 192, 242/55.14, 65, 66, 68.7, 67.1 R

[56] References Cited

U.S. PATENT DOCUMENTS

| 1,414,941 | 5/1922 | Gill | 242/187 |
| 3,161,361 | 12/1964 | Iida | 242/192 |
| 3,291,409 | 12/1966 | McClellan | 242/187 |
| 3,395,870 | 8/1968 | Klinger | 242/187 |
| 3,430,880 | 3/1969 | Breacker | 242/65 X |
| 3,506,345 | 4/1970 | Wells | 242/197 |
| 3,528,626 | 9/1970 | Bumb | 242/65 |
| 3,727,854 | 4/1973 | Grotzbach | 242/66 |

FOREIGN PATENT DOCUMENTS 2525747  12/1976  Fed. Rep. of Germany .

Primary Examiner—John M. Jillions
Assistant Examiner—Leo J. Peters
Attorney, Agent, or Firm—Peter K. Kontler

[57] ABSTRACT

A strip of exposed film which issues from a developing machine is convoluted onto the core of a horizontal takeup reel whose flange or flanges rest on the peripheral surface of a horizontal roller which is driven to rotate the reel in a direction to convolute the strip. The strip is braked by a tensioning device between the developing machine and the reel, and the latter is thereby maintained in a first position of abutment with the concave internal surface of a first locating device and in contact with the driven roller. A spring-biased lever urges the reel to a second position in which the reel is out of contact with the roller and abuts against the concave inner side of a second locating device. The lever is free to move the reel sideways and to the second position as soon as the action of the tensioning device upon the strip is terminated, namely, as soon as the trailing end of the strip advances beyond the tensioning device. The first locating device is mounted between the second locating device and the tensioning device, and the two locating devices define a gap for the upper portion of the roller. The latter is nearer to the first than to the second locating device and its upper portion is engaged by the flange or flanges of the reel when the latter is held in the first position.

26 Claims, 1 Drawing Figure

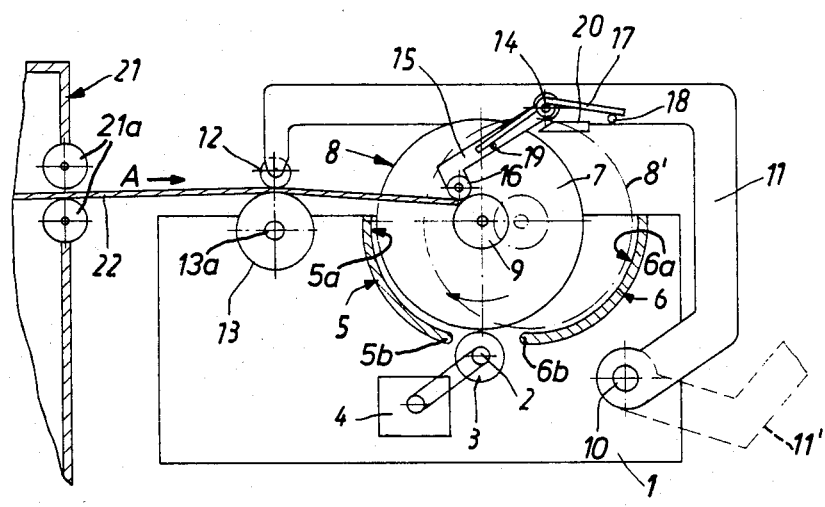

APPARATUS FOR CONVOLUTING STRIPS OF PHOTOSENSITIVE MATERIAL OR THE LIKE

BACKGROUND OF THE INVENTION

The present invention relates to apparatus for manipulating strips, webs, tapes or like elongated flexible commodities, and more particularly to improvements in apparatus for convoluting strips of photosensitive material or the like. Still more particularly, the invention relates to improvements in apparatus wherein the strip is convoluted onto the core of a reel which rests on and receives torque from a driven roller or an analogous rotary element.

German offenlegungsschrift No. 25 25 747 discloses an apparatus wherein the flanges of a horizontal takeup reel rest by gravity on and are thus driven by a horizontal roller which receives torque from a prime mover. The reel is connectable with pivot arms which project laterally therefrom and can be suspended on a horizontal rod extending in parallelism with the reel. The reel is then free to rest on the driven roller. A drawback of such apparatus is that, when the convoluting operation is completed, the reel continues to rotate in response to rotation of the roller whereby the trailing end of the convoluted strip repeatedly strikes against the frame of the apparatus, against the driven roller and/or against other neighboring parts with the result that its emulsion-carrying side is scratched and/or otherwise damaged. The problem is aggravated if the apparatus comprises several coaxial reels which are placed one next to the other so as to receive torque from a common driven roller. In such apparatus, the drive for the roller cannot or should not be arrested when the winding of one of several strips is completed because this would interrupt the winding of the remaining strip or strips. Thus, if the apparatus is used to simultaneously convolute a very short and a very long strip on the cores of the two coaxial reels, the trailing end of the shorter strip will strike against the neighboring parts of the apparatus during the entire interval which elapses between completed winding of the shorter strip and completion of winding of the longer strip. Moreover, the suspension of reels on and detachment of reels from the aforementioned rod take up relatively long intervals of time.

OBJECTS AND SUMMARY OF THE INVENTION

An object of the invention is to provide an apparatus which can be used for convolution of a single strip at a time or for simultaneous convolution of two or more strips and which is constructed and assembled in such a way that the reel for the strip which is fully convoluted thereon is automatically disengaged from its drive means so that the trailing end of the fully convoluted strip cannot be scratched and/or otherwise damaged.

Another object of the invention is to provide an apparatus which can convolute short or long, wide or narrow strips with the same facility and with the same degree of reliability.

A further object of the invention is to provide an apparatus which can be used for winding of relatively stiff or readily flexible strips and which can be adjusted to select the compactness of the convoluted strip.

An additional object of the invention is to provide a novel and improved method of convoluting strips of photosensitive material or the like in such a way that the strips are not likely to be defaced and/or otherwise damaged, especially during the last stage and subsequent to completion of convolution onto the cores of reels or analogous takeup devices.

Still another object of the invention is to provide the apparatus with novel and improved means for terminating the transmission of torque to a reel which has collected a full length of flexible strip stock irrespective of whether the neighboring reel or reels continue to convolute the corresponding strip or strips therearound.

Another object of the invention is to provide an apparatus which can receive one or more strips directly from a treating machine, such as a developing machine for exposed photographic films or photographic paper.

An ancillary object of the invention is to provide the apparatus with novel and improved means for tightening the convolutions of a strip around the core of the takeup reel.

The invention is embodied in an apparatus for convoluting a strip, particularly a length of photographic film, photographic paper, X-ray film or other photosensitive material. The apparatus comprises at least one takeup reel which is connectable with the leader of the strip and means for rotating the reel in a direction to convolute therearound the strip whose leader is connected thereto. The rotating means comprises a rotary element which can comprise or constitute a preferably horizontal roller parallel to the reel and arranged to support the reel from below so that the reel can rest thereon under its own weight and under the weight of the convoluted portion of the strip. In accordance with a feature of the invention, the reel is movable substantially at right angles to its axis between a first position of engagement and a second position out of contact with the rotary element, and the apparatus further comprises tensioning means for normally maintaining the reel in the first position. Such tensioning means includes means for exerting upon the strip a force in a direction to oppose rotation of the reel with the rotary element. The reel preferably comprises a core which is connectable with the leader of the strip and one or more larger-diameter flanges which engage with and are driven by the rotary element in the first position of the reel.

The apparatus preferably further comprises first and second locating means against which the reel abuts in the respective positions, and means for yieldably biasing the reel to the second position with a force which is weaker than the force of the tensioning means so that the reel is maintained in the first position as long as the tensioning means exerts a force upon the strip. Such biasing means can comprise a torsion spring or another suitable reslient element. The rotary element is preferably mounted in such a way that it is nearer to the first than to the second locating means. The source which supplies the strip may constitute a strip treating (e.g., developing) machine, and the strip is arranged to advance in a predetermined direction from the source, into the range of the tensioning means and toward the reel when the latter is driven by the rotary element so that it convolutes the strip around its core. The first and second locating means are preferably disposed one after the other, as considered in the direction of advancement of the strip from the source to the reel. Such locating means can be substantially mirror symmetrical to one another with reference to a vertical plane which includes the axis of the rotary element, and each locating means can constitute approximately one-fourth of a hollow cylinder. The concave sides of the locating means face one another, and their lowermost portions are preferably located at or close to the same level. Such lowermost portions are spaced apart from one another so as to provide room for the upper portion of the rotary element which is disposed between the concave surfaces and extends at least slightly above the aforementioned level. Thus, the locating means flank the rotary element and the radii of curvature of their concave sides preferably match or approximate the radii of the flanges of the takeup reel.

Since the tensioning means is installed between the source and the takeup reel, the tensioning action is automatically terminated when the trailing end of the strip reaches the reel so that the biasing means is then free to automatically move the reel to the second position in which the reel cannot receive torque from the rotary element.

In accordance with a presently preferred embodiment of the improved apparatus, the tensioning means comprises a first braking member (e.g., a roller which is rotatable about a fixed axis at one side of the path of movement of the strip from the source to the reel), a second braking member (e.g., a second roller) which is movable against the other side of the strip opposite the first braking member so that the strip is urged against the first braking member with a predetermined force. The force of the biasing means is weaker than such predetermined force so that the reel continues to remain in the first position as long as the running strip is urged against the first braking member. The second braking member can be mounted on a carrier (e.g., a carrier including or constituting a substantially U-shaped yoke) which is movable (preferably pivotable) between an operative position in which the second braking member urges the running strip against the first braking member and an inoperative position in which the second braking member is remote from the first braking member. The biasing means can comprise a lever which is pivotally mounted on the carrier and whose free end portion is provided with a roll. The lever is biased against the core of the reel, or against the outermost convolution of the strip on the core, as long as the carrier is held in the operative position. The means for biasing the lever can include or constitute the aforementioned torsion spring. The lever automatically moves the reel to the second position as soon as the trailing end of the strip advances beyond the nip of the braking members, i.e., as soon as such braking members cease to oppose advancement of the strip from the source toward the reel.

The novel features which are considered as characteristic of the invention are set forth in particular in the appended claims. The improved convoluting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a schematic partly elevational and partly vertical sectional view of an apparatus which embodies one form of the invention, the first and second positions of the takeup reel being respectively indicated by solid and phantom lines.

DESCRIPTION OF THE PREFERRED EMBODIMENTS

The drawing shows a convoluting apparatus which includes a frame having two parallel upright sidewalls 1 (only one shown) which can be held at a desired distance from one another by one or more distancing elements, not shown. The sidewalls 1 support the end portions of a horizontal shaft 2 whose axis extends at right angles to the plane of the drawing and which carries a rotary element 3 in the form of an elongated roller. The shaft 2 and its roller 3 are driven by a prime mover 4, e.g., a variable-speed electric motor, which is or can be mounted in the space between the two sidewalls 1.

The frame including the sidewalls 1 further supports two stationary locating devices 5 and 6 which flank the roller 3 and are substantially mirror symmetrical to one another with reference to a vertical plane including the axis of the shaft 2. Each of the locating devices 5 and 6 constitutes or resembles one-fourth of a hollow cylinder and their concave sides 5a, 6a face one another. The lowermost portions 5b, 6b of the locating devices 5, 6 are disposed at or close to the same level which is slightly below the apex of the roller 3, i.e., the upper portion of the roller extends into and slightly above the gap or slot between the lowermost portions 5b, 6b of the respective locating devices. The radii of curvature of concave sides 5a, 6a equal or approximate the radius of a flange 7 forming part of a removable takeup reel 8 which is installed between the locating devices 5, 6 and whose horizontal core 9 is parallel to the shaft 2 and roller 3. The reel 8 is preferably provided with two axially spaced flanges 7, one at each axial end of the core 9, and the peripheral surfaces of these flanges abut against the concave side 5a of the left-hand locating device 5 and simultaneously contact the peripheral surface of the roller 3 when the reel 8 is held in the solid-line (first) position. The reel 8 is movable sideways (i.e., at right angles to its axis) to a second position 8' which is shown by phantom lines and in which the flanges 7 abut against the concave side 6a of the locating device 6 and are out of contact with the peripheral surface of the roller 3. As shown, the upper edge faces of the locating devices 5, 6 are flush or substantially flush with the upper edge face of the illustrated sidewall 1 so that the reel 8 can be simply dropped into or lifted out of the space between the devices 5, 6 with little or no loss of time. The distance between the lowermost portion 5b of the locating device 5 and the roller 3 is somewhat less than the distance between this roller and the lowermost portion 6b of the locating device 6. The locating device 5 is located between the locating device 6 and a treating machine 21 which latter constitutes a source of supply of unconvoluted strip 22. Successive increments of the strip 22 issue from the nip between two idler rollers 21a in the outlet of the treating machine 21, e.g., a developing machine for exposed photographic films, photographic paper, X-rays films or like photosensitive materials. The arc along which the concave side 6a extends is somewhat longer than the arc of the concave side 5a; this ensures that the concave side 6a can support the reel 8 in the second position 8' even if the reel is not biased thereagainst. On the other hand, the flanges 7 of the reel 8 are compelled to contact the driven roller 3 when they abut against the concave side 5a of the left-hand locating device 5. The locating devices 5 and 6 can be said to define a substantially horizontal semicylindrical trough or cradle whose bottom portion has a longitudinally extending slot (between the lower end portions 5b, 6b) for the upper portion of the roller 3.

The sidewalls 1 of the frame further support a second horizontal shaft 10 which is parallel to the shaft 2 and supports a pivotable carrier 11 here shown as an inverted U-shaped yoke which is movable about the axis of the shaft 10 between an operative position which is shown by solid lines and an inoperative position 11' which is indicated by broken lines. The free end portion of the carrier 11 supports a roller-shaped braking member 12 forming part of a strip tensioning device which further includes additional roller-shaped braking member 13 mounted on a horizontal shaft 13a installed in the frame including the sidewalls 1 so that it extends in parallelism with the shafts 2 and 10. The leader of the illustrated strip 22 is assumed to be attached to the core 9 of the takeup reel 8 by adhesive tape or by extending into a slot of the core. When the prime mover 4 is on, the reel 8 draws the strip 22 from the treating machine 21 in the direction of arrow A whereby successive increments of the strip advance through the nip of the roller-shaped braking members 12 and 13. The upper braking member 12 bears against the upper side of the running strip 22 with a predetermined preferably adjustable force so that the strip 22 is urged against the lower braking member 13. The force with which the braking members 12, 13 of the tensioning device oppose forward movement of the strip 22 suffices to ensure that the strip maintains the reel 8 in the solid-line position in which the flanges 7 engage the concave side 5a of the locating device 5 and are simultaneously driven by the roller 3 in a direction to convolute the strip 22 onto the core 9. The carrier 11 overlies the reel 8 in the space between the locating members 5, 6 and can be moved to the inoperative position 11' by hand or by a suitable handle, not shown. The weight of the carrier 11, plus the weight of the braking member 12 and of a biasing unit which is mounted on the carrier, is selected with a view to ensure that the force with which the upper braking member 12 urges the strip 22 against the lower braking member 13 invariably suffices to maintain the reel 8 in the first position as long as the strip 22 is running along its path from the treating machine 21 toward the convoluting station. If desired, the force with which the braking member 12 bears against the strip 22 can be enhanced by the provision of one or more springs (not shown) which urge the carrier 11 to its operative position.

The aforementioned biasing unit comprises a horizontal shaft 14 which is mounted on the carrier 11 and is parallel to the shaft 2, a lever 15 which is pivotable about the axis of the shaft 14 and whose end portion carries a small roll 16, and a coiled torsion spring 17 which is convoluted around the shaft 14. One leg of the spring 17 bears against a post 19 on the lever 15 and the other leg of this spring reacts against a post 18 on the carrier 11 in such a way that the lever 15 is biased in a counterclockwise direction, as viewed in the drawing, and its roll 16 bears against the core 9 or against the outermost convolution of that portion of the strip 22 which is convoluted onto the core. The force with which the lever 15 urges the roller 16 against the reel 8 in a direction to move the reel to the second position 8' (i.e., into abutment with the concave side 6a of the right-hand locating device 6) is weaker than the force of the tensioning device including the braking members 12, 13 between the reel and the treating machine 21. In the absence of a takeup reel in the space between the locating devices 5 and 6, the spring 17 maintains the lever 15 in contact with a stop 20 on the carrier 11.

The operation is as follows:

The leader of the strip 22 which issues from the treating machine 21 is attached to the core 9 of the takeup reel 8, e.g., before the reel is inserted into the cradle which is defined by the locating devices 5 and 6. At such time, the carrier 11 is maintained in the inoperative position 11' so that the reel 8 can be readily inserted into the cradle. In the next step, the operator moves the carrier 11 to the solid-line operative position so that the strip 22 is engaged by the braking members 12, 13 of the tensioning device and its forward movement under the action of the reel 8 (whose flanges 7 rest on and are rotated by the roller 3 in a counterclockwise direction, as viewed in the drawing) is opposed with a predetermined force which suffices to maintain the reel in the first position (i.e., in a position in which the reel continues to receive torque from the roller 3) in spite of the fact that the roll 16 of the lever 15 bears against the outermost convolution of the convoluted portion of the strip 22 as soon as the carrier 11 is moved to the solid-line position. The force with which the braking members 12, 13 oppose forward movement of the strip 22 can be enhanced by making the peripheral portion of the lower braking member 13 of an elastomeric material, such as rubber.

The prime mover 4 is preferably started before the reel 8 (with the leader of the strip 22 attached to the core 9) is inserted into the cradle. Thus, the driven roller 3 begins to rotate the reel 8 as soon as the latter is inserted into the apparatus in such position that its weight rests on the roller 3 and its flanges 7 abut against the concave side 5a of the left-hand locating device 5.

The tensioning device including the braking members 12, 13 becomes ineffective as soon as the trailing end of the strip 22 advances beyond the tensioning station. The spring 17 is then free to turn the lever 15 in a counterclockwise direction so that the roll 16 shifts the reel 8 sideways and into abutment with the concave side 6a of the locating device 6, i.e., the reel 8 ceases to rotate as soon as the convoluting operation is completed. The roll 16 thereupon maintains the reel in the position 8' and such roll also prevents unwinding of the strip 22 from the core 9 until the operator decides to move the carrier 11 to the inoperative position 11' preparatory to removal of the takeup reel from the cradle.

The left-hand locating device 5 (or at least that portion of this locating device which defines the concave surface 5a) is preferably made of high-quality steel or an equivalent metallic material which can stand long periods of frictional engagement with the flanges 7 of the reel 8. Of course, friction between the locating device 5 and the flanges 7 can be reduced by providing the device 5 with suitable idler rollers or annuli of spherical of otherwise configurated rolling elements and/or by providing such friction reducing elements on the flanges 7. Friction between the flanges 7 and the concave side 6a of the locating device 6 is of no consequence (and might even be desirable) since the reel 8 should cease to rotate as soon as it moves to the second position 8'. Friction between the flanges 7 and the roller 3 is preferably quite pronounced to thus ensure that the reel 8 will rotate as soon as it moves into and as long as it remains in contact with the roller 3. To this end, the peripheral portion of the roller 3 can be made of polyvinyl chloride or another suitable synthetic plastic material which is not likely to slip with reference to the peripheral surfaces of the flanges 7.

The speed at which the prime mover 4 drives the roller 3 is preferably such that the reel 8 tends to rotate at a speed which at least slightly exceeds the speed at which the strip 22 issues from the treating machine 21, even when the winding operation is nearly completed (i.e., when the diameter of the convoluted portion of the strip 22 is close to the maximum value).

The improved apparatus can be used for simultaneous winding of two or more strips. Thus, the width of the space between the sidewalls 1 of the frame can be selected with a view to provide room for installation of locating devices which define a cradle that is long enough to accommodate two or more coaxial takeup reels. The axial length of the roller 3 is then selected in such a way that this roller can drive the flanges of two or more reels. Such apparatus is preferably provided with a discrete tensioning device and a discrete carrier 11 for each of two or more takeup reels because this renders it possible to remove a filled reel while the apparatus continues to convolute the remaining strip or strips.

An important advantage of the improved apparatus is that its operation is not affected by the length of the strip 22 or by the lengths of two or more strips which are convoluted onto discrete reels in a simultaneous operation. This is due to the fact that a reel which has collected the entire strip is automatically moved to the second position 8' and comes to a halt by being urged against the concave side 6a of the locating device 6.

Another important advantage of the improved apparatus is that it can convolute one strip at a time with the same facility as two or more strips and that empty reels can be inserted into and filled reels withdrawn from the cradle while the apparatus is in actual use. Also, the trailing ends of convoluted strips cannot be scratched and/or otherwise damaged because a filled reel is automatically arrested by the aforediscussed simple but reliable mechanical means as soon as the winding operation is completed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for convoluting a strip, particularly a strip of photosensitive material, comprising:
   (a) a takeup reel for the strip;
   (b) means for rotating said reel so as to convolute the strip around the same, said reel being movable between a first position of engagement with and a second position of disengagement from said rotating means; and
   (c) means for tensioning the strip during convolution of the strip around said reel, said tensioning means being operative to maintain said reel in said first position while a tensile force in excess of a predetermined value is exerted on the strip, and said reel being arranged to move from said first position to said second position in automatic response to a reduction of the tensile force on the strip below the predetermined value.

2. The apparatus of claim 1, wherein said reel comprises at least one flange and said rotary element comprises a roller whose axis is parallel to the axis of said reel and which is engaged by said flange in the first position of said reel.

3. The apparatus of claim 1, further comprising first and second locating means against which the reel abuts in the respective positions thereof.

4. The apparatus of claim 1 for convoluting a strip of finite length, further comprising means for automatically moving said reel to said second position upon completion of convolution of the strip onto the reel.

5. The apparatus of claim 1, wherein said rotating means includes a rotary element arranged to support said reel from below.

6. The apparatus of claim 5, wherein said reel is arranged to bear against said rotary element under the action of gravity.

7. The apparatus of claim 1, said reel having an axis of rotation; and wherein said reel is movable between said first and second positions substantially at right angles to the axis of rotation thereof.

8. The apparatus of claim 1, wherein said reel is arranged to move from said first position to said second position in response to disengagement of the strip from said tensioning means.

9. The apparatus of claim 1, wherein said rotating means includes a single rotary drive element for engaging and thereby rotating said reel.

10. The apparatus of claim 1, comprising means for biasing said reel from said first position to said second position, said biasing means being designed to exert a force upon said reel which substantially equals the predetermined value.

11. Apparatus for convoluting a strip, particularly a strip of photosensitive material, comprising at least one reel connectable with the leader of the strip; means for rotating the reel in a direction to convolute therearound the strip whose leader is connected thereto, including a rotary element arranged to support the reel from below so that the reel can rest thereon under its own weight and the weight of the convoluted strip, said reel being movable substantially at right angles to its axis between a first position of engagement with and a second position of disengagement from the rotary element; first and second locating means against which the reel abuts in the respective positions thereof; tensioning means for normally maintaining the reel in said first position, including means for exerting upon the strip a force in a direction to oppose rotation of the reel with said rotary element; and means for yieldably biasing the reel to said second position with a force which is weaker than the force of said tensioning means so that the reel is maintained in the first position as long as the tensioning means exerts a force upon the strip.

12. The apparatus of claim 11, wherein said biasing means comprises a resilient element.

13. The apparatus of claim 11, wherein said rotary element is nearer to said first than to said second locating means.

14. The apparatus of claim 11, further comprising a source containing a supply of unconvoluted strip, the strip being arranged to advance in a predetermined direction from said source to said reel when the latter is rotated to convolute the strip therearound, said locating means being disposed one behind the other, as considered in the direction of advancement of the strip from said source toward said reel.

15. Apparatus for convoluting a strip, particularly a strip of photosensitive material, comprising at least one reel connectable with the leader of the strip; means for rotating the reel in a direction to convolute therearound the strip whose leader is connected thereto, including a rotary element arranged to support the reel from below so that the reel can rest thereon under its own weight and the weight of the convoluted strip, said reel being movable substantially at right angles to its axis between a first position of engagement with and a second position of disengagement from the rotary element; first and second locating means against which the reel abuts in the respective positions thereof, said locating means being substantially mirror symmetrical to one another; and tensioning means for normally maintaining the reel in said first position, including means for exerting upon the strip a force in a direction to oppose rotation of the reel with said rotary element.

16. Apparatus for convoluting a strip, particularly a strip of photosensitive material, comprising at least one reel connectable with the leader of the strip; means for rotating the reel in a direction to convolute therearound the strip whose leader is connected thereto, including a rotary element arranged to support the reel from below so that the reel can rest thereon under its own weight and the weight of the convoluted strip, said reel being movable substantially at right angles to its axis between a first position of engagement with and a second position of disengagement from the rotary element; first and second locating means against which the reel abuts in the respective positions thereof, each of said locating means having a concave side against which the reel abuts in the respective position thereof; and tensioning means for normally maintaining the reel in said first position, including means for exerting upon the strip a force in a direction to oppose rotation of the reel with said rotary element.

17. The apparatus of claim 16, wherein each of said locating means constitutes approximately one-fourth of a hollow cylinder.

18. The apparatus of claim 17, wherein said rotary element includes a substantially horizontal roller which is parallel to said reel, said locating means flanking said roller and being substantially parallel thereto, said concave sides of said locating means facing one another and having lowermost portions located substantially at the same level, said lowermost portions being spaced apart from one another and said roller having an upper portion disposed between said lowermost portions and extending at least slightly above said level.

19. Apparatus for convoluting a strip, particularly a strip of photosensitive material, comprising a source of supply of unconvoluted strip; at least one reel connectable with the leader of the strip; means for rotating the reel in a direction to convolute therearound the strip whose leader is connected thereto, including a rotary element arranged to support the reel from below so that the reel can rest thereon under its own weight and the weight of the convoluted strip, said reel being movable substantially at right angles to its axis between a first position of engagement with and a second position of disengagement from the rotary element; and tensioning means for normally maintaining the reel in said first position, including means for exerting upon the strip a force in a direction to oppose rotation of the reel with said rotary element, said tensioning means being disposed intermediate the reel and said source and being arranged to tension the running web so that the tensioning action is terminated when the web is fully convoluted onto the reel and the reel is then free to assume its second position.

20. The apparatus of claim 19, wherein said source includes a processing machine for exposed photosensitive strip.

21. The apparatus of claim 19, wherein said tensioning means includes a first braking member at one side of the running strip and a second braking member movable against the other side of the strip opposite said first braking member so that the strip is urged against the first braking member with a predetermined force.

22. The apparatus of claim 21, further comprising means for yieldably biasing the reel to said second position with a second force which is weaker than said predetermined force so that the reel remains in the first position as long as the running strip is urged against the first braking member.

23. The apparatus of claim 22, further comprising a carrier for said second braking member, said carrier being movable between an operative position in which said second braking member urges the running strip against the first braking member and an inoperative position in which said second braking member is remote from said first braking member.

24. The apparatus of claim 23, wherein said carrier includes a yoke which is pivotable between said operative and inoperative positions.

25. The apparatus of claim 23, wherein said biasing means is mounted on said carrier.

26. The apparatus of claim 25, wherein said biasing means comprises a lever pivotally mounted on said carrier, a roll on said lever, and resilient means for biasing said lever in a direction to maintain said roll in engagement with the reel or with the convoluted strip as long as said carrier is maintained in the operative position thereof.

* * * * *

UNITED STATES PATENT AND TRADEMARK OFFICE
CERTIFICATE OF CORRECTION

PATENT NO. : 4,494,706
DATED : January 22, 1985
INVENTOR(S) : Walter BECHERER et al.

It is certified that error appears in the above-identified patent and that said Letters Patent are hereby corrected as shown below:

Foremost page [75] Inventors: After the second "Munich" insert --; Franz Lechner, Grafing,--.

Signed and Sealed this

Twenty-eighth Day of May 1985

[SEAL]

Attest:

DONALD J. QUIGG

Attesting Officer    Acting Commissioner of Patents and Trademarks